3,448,149
BENZENESULFONYL UREAS
Walter Aumüller, Kelkheim, Taunus, Rudi Weyer and Helmut Weber, Frankfurt am Main, Karl Muth, Kelkheim, Taunus, and Felix Helmut Schmidt, Mannheim-Neuostheim, Germany, assignors to Farbwerke Hoechst Aktiengesellschaft vormals Meister Lucius & Bruning, Frankfurt am Main, Germany, a corporation of Germany
No Drawing. Filed Oct. 18, 1965, Ser. No. 497,553
Claims priority, application Germany, Oct. 30, 1964,
F 44,342
Int. Cl. C07c 147/06
U.S. Cl. 260—553                    19 Claims

ABSTRACT OF THE DISCLOSURE

Benzenesulfonyl ureas and physiologically tolerable salts thereof with hypoglycemic properties having the formula

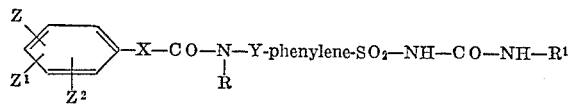

in which

R is hydrogen, lower alkyl or lower phenylalkyl;
$R^1$ is (a) alkyl or alkenyl of 2 to 8 carbon atoms; (b) lower phenylalkyl or phenylcyclopropyl; (c) lower cyclohexylalkyl, cycloheptylmethyl, cycloheptylethyl or cyclooctylmethyl; (d) endoalkylene-cyclohexyl, endoalkylene - cyclohexenyl, endoalkylene-cyclohexylmethyl or endoalkylene-cyclohexenylmethyl with 1 to 2 endoalkylene-carbon atoms; (e) lower alkylcyclohexyl or lower alkoxycyclohexyl; (f) cycloalkyl of 5 to 8 carbon atoms; or (g) cyclohexenyl or cyclohexenylmethyl;
X is a saturated or mono-olefinically unsaturated hydrocarbon chain of 1 to 6 carbon atoms that is unsubstituted or substituted by halogen, hydroxy, oxo, lower alkanoyloxy or lower alkoxy;
Y is a saturated hydrocarbon chain containing 1 to 4 carbon atoms;
Z is hydrogen, lower alkyl, lower alkoxy, halogen, cycloalkoxy of 5 to 6 carbon atoms, cyclohexyl, lower alkylmercapto, lower alkylsulfinyl, lower alkylsulfonyl, phenylsulfonyl, phenyl, lower phenylalkyl, lower alkanoyl, benzoyl, trifluoromethyl, hydroxy, lower alkanoyloxy, benzyloxy, carboxy, lower carbalkoxy, nitrile, carbamyl, lower alkylcarbamyl, lower dialkyl-carbamyl or nitro; and
$Z^1$ and $Z^2$ are hydrogen, lower alkyl, lower alkoxy or halogen when Z is hydrogen, hydroxy, carboxy, alkyl, alkoxy or halogen, or $Z^1$ and $Z^2$ together are

—O—CH$_2$O— when Z is hydrogen.

The present invention relates to benzenesulfonyl-ureas of the formula

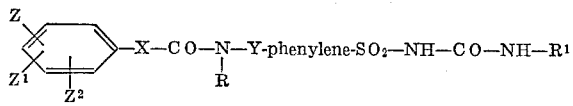

in which

R is hydrogen, lower alkyl or lower phenylalkyl;
$R^1$ is (a) alkyl, alkenyl, or mercaptoalkyl of 2 to 8 carbon atoms; (b) alkoxyalkyl, alkylmercaptoalkyl or alkylsulfinylalkyl of 4 to 8 carbon atoms each, at least 2 of which carbon atoms forming the alkylene portion of the alkoxyalkyl, alkylmercapto-alkyl or alkylsulfinyl-alkyl; (c) lower phenylalkyl, phenylcyclopropyl; (d) lower cyclohexylalkyl, cycloheptylmethyl, cycloheptylethyl or cyclooctylmethyl; (e) endoalkylene-cyclohexyl, endoalkylene-cyclohexenyl, endoalkylene-cyclohexylmethyl, or endoalkylene-cyclohexenylmethyl of 1 to 2 endoalkylene-carbon atoms; (f) lower alkylcyclohexyl, lower alkoxycyclohexyl; (g) cycloalkyl of 5 to 8 carbon atoms; (h) cyclohexenyl, cyclohexenylmethyl; (i) a heterocyclic ring of 4 to 5 carbon atoms and 1 oxygen atom or 1 sulfur atom and up to 2 ethylenic double linkages; or (k) a heterocyclic ring as defined under (i) linked to the nitrogen atom by means of a methylene radical;
X is a hydrocarbon chain containing 1 to 6 carbon atoms and substituted by halogen, hydroxy, oxo, lower acyloxy or lower alkoxy;
Y is a hydrocarbon chain containing 1 to 4 carbon atoms;
Z is hydrogen, lower alkyl, lower alkoxy, halogen, cycloalkoxy of 5 to 6 carbon atoms, cyclohexyl, lower alkylmercapto, lower alkylsulfinyl, lower alkylsulfonyl, phenylsulfonyl, phenyl, lower phenylalkyl, lower acyl, benzoyl, trifluoromethyl, hydroxy, lower acyloxy, benzyloxy, carboxy, lower carbalkoxy, nitril, carbamyl, lower alkylcarbamyl, lower dialkyl-carbamyl or nitro;
$Z^1$ and $Z^2$ are, independently of each other, hydrogen or—
Z being hydrogen, hydroxy, carboxy, alkyl, alkoxy or halogen—also lower alkyl, lower alkoxy or halogen, or
—Z being hydrogen—$Z^1$ and $Z^2$ together represent the methylenedihydroxy group —O—CH$_2$O— as well as the salts of the above-mentioned benzenesulfonyl-ureas.

In the above-mentioned and following definitions "lower alkyl" always means radicals with 1 to 4 carbon atoms in a straight or branched chain. "Lower acyl" stands for an acyl radical (organic acid radical) having up to 4 carbon atoms, preferably, a straight-chain or branched alkanoyl radical of the indicated chain length.

In accordance with the definitions given above, R may represent, for example, methyl, ethyl, propyl, isopropyl, butyl, isobutyl, tert. butyl, benzyl, α- or β-phenylethyl, α-, β- or γ-phenylpropyl. Compounds in which R stands for methyl or benzyl and, above all, those in which R represents hydrogen, are preferred. $R^1$ may represent, for example, ethyl, propyl, isopropyl, butyl, isobutyl, sec. butyl, straight-chain or branched amyl (pentyl), hexyl, heptyl, or octyl, the radicals with an ethylenic double linkage, such as allyl or crotyl, corresponding to the above-mentioned hydrocarbon radicals. Furthermore, alkyls of 2 to 8 carbon atoms carrying in addition, a mercapto group such as β-mercaptoethyl or higher mercaptoalkyls. $R^1$ may likewise represent, for example, γ-methoxypropyl, δ-methoxy-n-butyl, β-ethoxyethyl, γ-ethoxypropyl, δ-ethoxybutyl or higher alkyloxyethyls, -propyls or -butyls as well as the corresponding groups in which the oxygen atom is replaced by a sulfur atom or the —SO-group. Furthermore, $R^1$ may stand for benzyl, α-phenylethyl, β-phenylethyl, α-, β- or γ-phenylpropyl or phenylbutyls.

Within the scope of the invention, there are particularly preferred compounds containing as $R^1$ a cycloaliphatic hydrocarbon radical which may be substituted by alkyl or alkoxy or linked to the nitrogen atom by means of alkylene. Said radicals comprise, for example, cyclopentyl, cyclohexyl, cycloheptyl, cyclooctyl, methylcyclohexyl, ethylcyclohexyl, propyl- and isopropyl-cyclohexyl, methoxycyclohexyl, ethoxycyclohexyl, propoxy- and isopropoxycyclohexyl. The alkyl or alkoxy groups may stand in 2-, 3- or, preferably, 4-position, in cis- as well as in trans-position. Furthermore, there are mentioned cyclohexylmethyl, α- or β-cyclohexylethyl, cyclohexylpropyls, endomethylene-cyclohexyl (2,2,1-tricycloheptyl), endoethylene-cyclohexyl (2,2,2-tricyclooctyl), endomethylene-cyclohexenyl, endoethylene-cyclohexenyl, endomethylene-cyclohexylmethyl, endoethylene-cyclohexylmethyl, endomethylene-cyclohexenylmethyl or endoethylene-cyclohexenylmethyl, α- or β-phenylcyclopropyl in cis- as well as in trans-form. Finally, there are suitable as $R^1$ heterocyclic rings containing, in addition to 4 to 5 carbon atoms, 1 oxygen or sulfur atom and up to 2 double linkages which may be bound to the adjacent nitrogen atom by means of a methylene-group. Examples of said heterocyclic rings are the following rings:

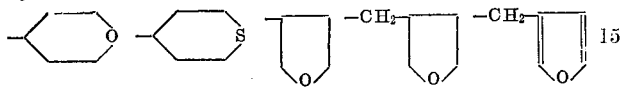

According to the definition X is a bridging member containing 1 to 6 carbon atoms and substituted by halogen, hydroxy, oxo, lower acyloxy or lower alkoxy. This bridging member can be in a straight or branched chain and can, if desired, contain double linkages, too. But unbranched, saturated hydrocarbon chains carrying a substituent of the above-mentioned kind are preferred. Suitable as X are, for example, —CHCl—, —CHBr—, CHCl—CH₂—, —CCl(CH₃)—, —CHCl—CH₂—CH₂—, —CH₂—CHCl—CH₂—, —CH₂—CH₂—CHCl—

—CH₂—CH₂—CH₂—CHCl—

—CHCl—CH₂—CH(CH₃)—CH₂—, —CHOH—

—CH₂—CHOH—, —CHOH—CH₂—

—CH₂—CH₂—CH₂—CHOH—

—CH₂—CH(CH₃)—CHOH—

—CHOH—CH₂—CH(CH₃)—CH₂—

—CH(OCOCH₃)—, —CH(OCOCH₃)—CH₂—

—CH—(OCOCH₃)—CH₂—CH₂—

—CH(OCOCH₃)—CH₂—CH₂—CH₂—

—CH₂—CH₂—CH₂—CH—(OCOCH₃)—

—CH(OCOCH₂.CH₃)—

—CH(OCO.CH₂CH₃)—CH₂—

—CH(OCO.CH₂.CH₂.CH₃)—

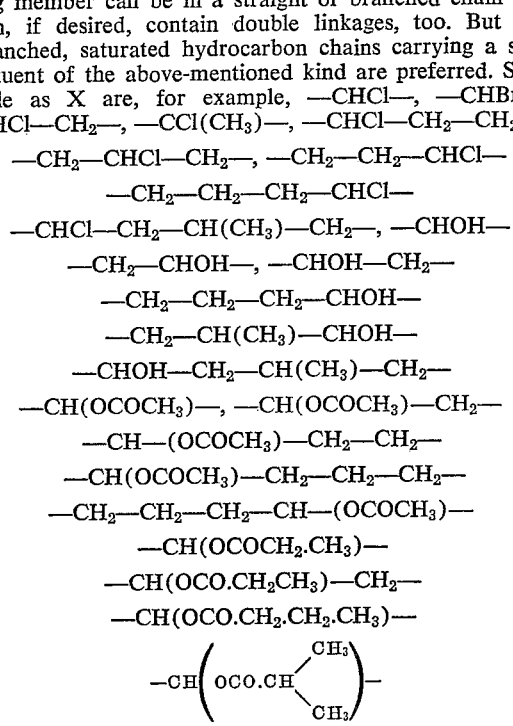

—CH(OCOCH₂CH₃)—CH₂—, —CH(OCH₃)—

—CH(OC₂H₅)—, —CH(OC₃H₇)—, —CH(OC₄H₉)—,

—CH(OCH₃)—CH₂—, —CH(OC₂H₅)—CH₂—

—CH—(OC₃H₇)—CH₂—CH₂—

—CH₂—CH₂—CH₂—CH(OCH₃)—, —CO—CH₂—

—CH(OCH₃)—CH₂—CH(CH₃)—CH₂—

Y represents a hydrocarbon chain containing 1 to 4 carbon atoms, which may be straight or branched.

As examples for the substituents Z, $Z^1$ and $Z^2$ there are mentioned methyl, ethyl, propyl, isopropyl, n-, iso-, or tert.-butyl as well as the corresponding alkoxy groups, fluorine, chlorine, bromine, iodine, cyclohexyloxy, cyclopentyloxy, methyl-ethyl-, propyl- or butyl-mercapto, -sulfinyl or sulfonyl with alkyl radicals in a straight or branched chain, benzyl, phenylethyl, phenylpropyl, acetyl, propionyl, butyryl, acetoxy, propionyloxy, butyryloxy, carbomethoxy, carboethoxy, carbopropoxy, methylcarbamyl, ethylcarbamyl, dimethyl- or diethylcarbamyl.

The phenylene radical indicated in the formula by -phenylene- may preferably be unsubstituted or also be substituted once or several times by halogen, lower alkyl or lower alkoxy. It may contain the remaining parts of the molecule in ortho-, meta- or para-position to one another, the para-position being preferred.

The said benzenesulfonyl-ureas can be prepared according to methods which are, generally, applied for preparing compounds of the like. These benzenesulfonyl-ureas are prepared according to the following methods:

(a) Amines of the formula $R^1NH_2$ or, if desired, their salts are reacted with benzenesulfonyl-isocyanates, -carbamic acid esters, -thiocarbamic acid esters, -carbamic acid halides or -ureas carrying the substituent

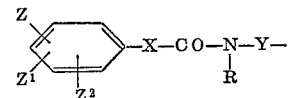

(b) Benzenesulfonamides carrying the substituent

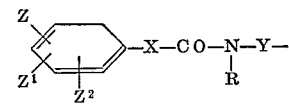

or their salts are reacted with $R^1$-substituted isocyanates, -carbamic acid esters, -thiocarbamic acid esters, carbamic acid halides or -ureas.

(c) Benzenesulfonyl chlorides carrying the substituent

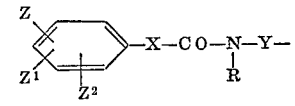

or their salts are reacted with $R^1$-substituted ureas, isourea ethers, isothiourea ethers or parabanic acids and the benzenesulfonyl-isourea ethers or benzenesulfonyl-parabanic acids obtained in this or another manner are hydrolized.

(d) In correspondingly substituted benzenesulfonyl-thioureas, the sulfur atom is replaced by an oxygen atom.

(e) Correspondingly substituted benzenesulfenyl-ureas or benzenesulfinyl-ureas are oxidized.

(f) In benzenesulfonyl-ureas of the formula

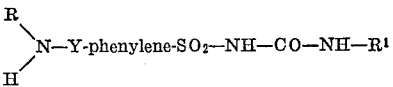

the radical

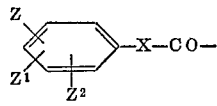

is introduced by acylation in one or several reaction stages.

(g) In benzenesulfonyl-ureas of the above-mentioned formula in which hydroxy- or carboxy groups protected by esterification or hydroxy groups protected by etherification are present, the said groups are liberated by hydrolysis or by catalytic hydrogenation, or (h) In benzenesulfonyl-ureas of the above-mentioned formula in which X contains an ethylenic double linkage, the said linkage is hydrogenated, and the products obtained may be treated with alkaline agents, if salt formation is desired.

Depending on the nature of the members Z, $Z^1$, $Z^2$, X and $R^1$, in some cases the one or the other of the said methods will prove unsuitable for preparing the individual compounds falling under the general formula, or will, at least, make necessary provisions for protecting active groups. Such cases can easily be discovered by the expert, and there is no difficulty in successfully applying a different synthesis of those described above. It may therefore be required to protect the carboxyl groups which are present in Z or in the radical X, by esterification instead of the hydroxy groups present in the corresponding radicals by esterification or etherification. The same applies to cases in which $R^1$ represents a mercaptoalkyl group.

The said benzenesulfonyl-carbamic acid esters or

-thiocarbamic acid esters may carry a lower alkyl radical or a phenyl radical in the alcohol component. The same applies to R¹-substituted carbamic acid esters or the corresponding monothiocarbamic acid esters.

As carbamic acid halides the chlorides are used in the first place.

The benzenesulfonyl-ureas to be used as starting substances may be unsubstituted at the side of the urea molecule opposite to the sulfonyl group or may be substituted once or twice, preferably, by lower alkyl radicals or aryl radicals which may be linked with one another, if desired, by a chemical linkage or by means of a bridging member such as —CH₂—, —NH, —O— or —S—. Instead of benzenesulfonyl-ureas substituted in this manner, there can also be used corresponding N-benzenesulfonyl-N'-acyl-ureas which, in addition, may be alkylated or arylated to the N'-nitrogen atom, and also bis-(benzenesulfonyl)-ureas. It is possible, for example, to treat such bis-(benzenesulfonyl)-ureas or N-benzenesulfonyl-N'-acyl-ureas with amines of the formula R¹—NH₂. The salts obtained are heated to elevated temperatures, especially, to temperatures above 100° C.

It is likewise possible to start from ureas of the formula R¹—NH—CO—NH₂ or from acylated ureas of the formula R¹—NH—CO—NH—acyl, in which acyl represents an aliphatic or aromatic acid radical, preferably, of low molecular weight, or the nitro group, of from phenyl ureas of the formula R¹—NH—CO—NH—C₆H₅ or from diphenyl-ureas of the formula R¹—NH—CO—N(C₆H₅)₂ wherein the phenyl radicals can be substituted and can be linked with one another directly or by means of a bridging member such as —CH₂—, —NH—, —O—, or —S—, or from N,N'-disubstituted ureas of the formula R¹—NH—CO—NH—R¹, and to react said compounds with

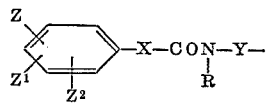

-substituted benzenesulfonamides.

In the corresponding substituted benzenesulfonylthioureas the sulfur atom can be replaced by an oxygen atom, for example, with the aid of oxides or salts of heavy metals or with the use of oxidizing agents such as hydrogen peroxide, sodium peroxide or nitrous acid. The thioureas can likewise be desulfurized by treating them with phosgene or phosphorus pentachloride. Chloroformic acid amidines or chloroformic acid carbodiimides obtained as intermediate product, can be converted into the benzenesulfonyl-ureas by an appropriate treatment, for example, by hydrolysis or addition of water.

When esters or benzylethers are used, they can be split off subsequently to obtain the free compounds. Likewise, a hydroxy or carboxy group standing as Z, can be protected and the protecting group can be split off subsequently with each of the said reaction types. If Z represents a hydroxy group, acyl groups, especially, lower alkanoyl-groups and the benzoyl group as well as hydrocarbon radicals, in the first place, benzyl, which can be split off by hydrolysis or by catalytic hydrogenation, can be used as protective groups. If Z represents a carboxy group, said group is protected by esterification with the aid of alcohols, especially lower aliphatic alcohols or benzyl alcohol, and subsequently, it is split off by hydrolysis. If compounds containing carbalkoxy or acyloxy or benzyloxy are desired, a hydrolysis must, of course, not be carried out.

As regards the reaction conditions, the forms of carrying out the process of the invention can, in general, vary within wide limits and can be adopted to each individual case.

For example, the reactions can be effected with the use of solvents, at room temperature or at an elevated temperature.

As starting substances there are used, on the one hand, compounds containing a benzene radical substituted by the group

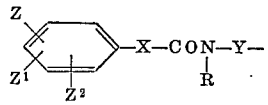

As examples of the component

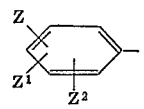

of this formula there are mentioned the following groups:

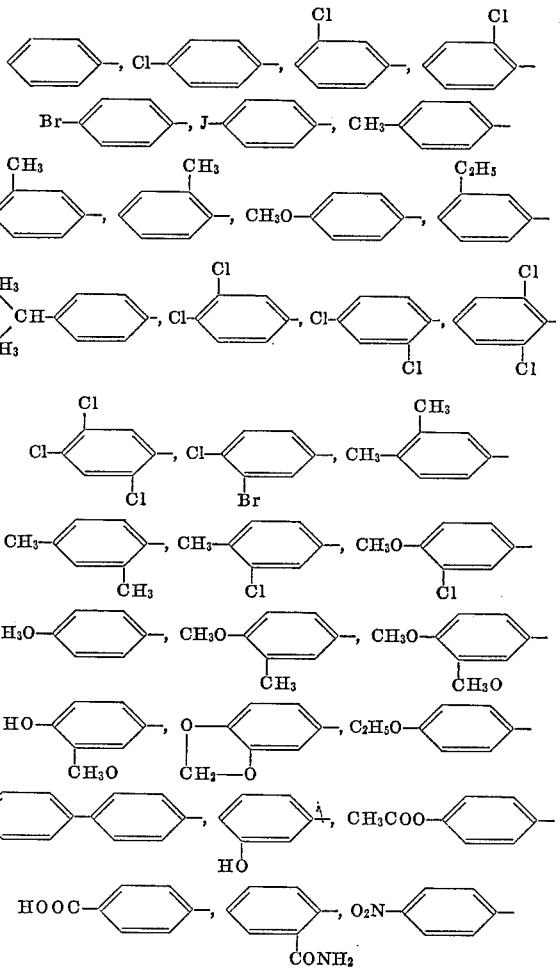

The benzenesulfonyl-urea derivatives obtained according to the process of the invention are valuable medicaments which are distinguished by a strong and particularly long-lasting action of lowering the blood sugar level. Their blood sugar lowering action could be ascertained, for example, on rabbits, by feeding the products obtained, in a dose of 10 milligrams/kilogram, and by determining the blood sugar value according to the known method of Hagedorn-Jensen.

By this method, it has now been found, for example, that the N-[4-(β-<α-chloro-phenylacetamido> - ethyl)-benzenesulfonyl]-N'-cyclohexyl-urea provokes a lowering of the blood sugar of 31% after 3 hours.

If said product is compared with the widely used N-(4-methylbenzenesulfonyl)-N'-butyl-urea known as oral antidiabetic it is found that the given dosage of 10 milligrams/kilogram administered to rabbits provokes no lowering of the blood sugar level. Only when a dose of 25 milligrams/kilogram and more is administered, a lowering of the blood sugar level can be observed.

The superior action of the products of the invention is confirmed, for example, by the following compounds (a dosage of 10 milligrams/kilogram administered to rabbits):

| | Blood sugar lowering rate, percent |
|---|---|
| N-[4-(β-<α-methoxy-phenylacetamido>-ethyl)-benzenesulfonyl]-N'-(4-ethyl-cyclohexyl)-urea | 20 |
| N-[4-(β-<α-ethoxy-phenylacetamido>-ethyl)-benzenesulfonyl]-N'-cyclohexyl-urea | 20 |
| N-[4-(β-<α-ethoxy-phenylacetamido>-ethyl)-benzenesulfonyl]-N'-butyl-urea | 27 |
| N-[4-(β-<α-ethoxy-phenylacetamido>-ethyl)-benzenesulfonyl]-N'-(4-ethylcyclohexyl)-urea | 23 |

The strong blood sugar lowering action of the products of the invention becomes particularly evident when reduced doses are administered. When N-[4-(β-<α-chlorophenyl-acetamido> - ethyl) - benzenesulfonyl]-N'-cyclohexyl-urea is administered to rabbits in a dose of 0.3 milligram/kilogram or N-[4-(β-<α-methoxy-phenylacetamido>-ethyl)-benzenesulfonyl] - N' - (4 - ethyl-cyclohexyl)-urea in a dose of 0.3 milligram/kilogram p.o., distinct lowering of the blood sugar level can still be observed.

The benzenesulfonyl-ureas described above are intended to be used, preferably, for the manufacture of orally administerable preparations that have blood sugar lowering action in the treatment of diabetes mellitus; they can be applied as such or in the form of their salts or in the presence of substances that cause salt formation. For such salt formation there can be used, for example, alkaline agents such as alkali metal hydroxides, alkaline earth metal hydroxides, alkali metal carbonates, and alkaline earth metal carbonates, alkali metal bicarbonates and alkaline earth metal bicarbonates, but also organic bases, especially, tertiary nitrogen bases, provided that they are physiologically tolerated.

As pharmaceutical preparations there enter into consideration, preferably, tablets which contain, in addition to the products of the invention, the usual adjuvants and carriers such as talc, starch, lactose, tragacanth or magnesium stearate.

A preparation containing the above-mentioned benzenesulfonyl-ureas as the active substance, for example, a tablet or a powder, with or without the above-mentioned additives, is suitably processed into appropriate dosage unit form. The dose chosen should comply with the efficacy of the benzenesulfonyl-urea used and with the desired effect. Advantageously, the dosage per unit is in the range of from about 0.5 to 100 milligrams, preferably, 2 to 10 milligrams. There can, however, also be used considerably higher or lower dosage units which, if desired, may be divided or multiplied prior to their application.

The following examples illustrate the invention, but they are not intended to limit it thereto:

EXAMPLE 1

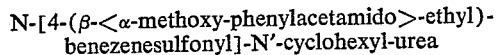

17.4 g. of 4-[β-(α-methoxy-phenylacetamido)-ethyl]-benzenesulfonamide (melting point 167–169° C., made of 4-(β-aminoethyl)-benzenesulfonamide and α-methoxy-phenyl-acetic acid chloride) were dissolved in 200 ml. of acetone by adding 2 g. of sodium hydroxide and water. 6.5 g. of cyclohexylisocyanate were added dropwise while stirring at room temperature and the stirring was continued for 2 hours. A slight turbidity was filtered off and water and dilute hydrochloric acid were added to the filtrate. The precipitated reaction product was filtered off with suction and recrystallized from water/alkanol. The N-[4-(β-<α-methoxy-phenylacetamido>ethyl) - benzenesulfonyl]-N'-cyclohexyl-urea had a melting point of 181–182° C.

In analogous manner there were obtained:

the N-[4 - (β-<methoxy-phenylacetamido>-ethyl) - benzenesulfonyl]-N'-butyl-urea (melting point: 136–138° C.)
the N-[4-(β-<α-methoxy-phenyl-acetamido>-ethyl)-benzenesulfonyl]-N'-(4-methyl-cyclohexyl) - urea (melting point: 189–191° C.)
the N-[4-(β-<α-methoxy-phenylacetamido>-ethyl) - benzenesulfonyl]-N'-(4 - ethylcyclohexyl) - urea (melting point: 185° C.)

from 4-(α-methoxy-phenylacetamido-methyl) - benzenesulfonamide (melting point: 139° C.)
the N-[4 - (β-<α-methoxy - phenylacetamido>-methyl)-benzenesulfonyl]-N'-cyclohexyl-urea (melting point: 179–181° C.)
the N-[4-(α-methoxy-phenylacetamido-methyl)-benzenesulfonyl]-N'-butyl-urea (melting point: 142–144° C.)

from

4-[β-(α-ethoxy-phenylacetamido)-ethyl] - benzenesulfonamide (melting point: 123–125° C.)
the N-[4-(β-<α-ethoxy - phenylacetamido>-ethyl) - benzenesulfonyl]-N'-cyclohexyl-urea (melting point: 119–121° C.)
the N-[4-(β-<α-ethoxy - phenylacetamido>-ethyl) - benzenesulfonyl] - N' - butyl - urea (melting point: 124–126° C.)
the N-[4-(β-<α-ethoxy - phenylacetamido>-ethyl) - benzenesulfonyl]-N'-(4-methylcyclohexyl) - urea (melting point: 142° C.)
the N-[4-(β-<α-ethoxy - phenylacetamido>-ethyl) - benzenesulfonyl]-N'-(4-ethyl-cyclothexyl) - urea (melting point: 166–168° C.)

from 4-(α-ethoxy-phenylacetamido - methyl) - benzenesulfonamide (melting point: 159–161° C.)
the N-[4-(α-ethoxy-phenylacetamido - methyl) - benzenesulfonyl]-N'-cyclohexyl - urea (melting point: 175–177° C.)

from

4-[β-(α-isopropoxy - phenylacetamido)-ethyl] - benzenesulfonamide (melting point: 116–119° C.)
the N-[4 - (β-<α-isopropoxy - phenylacetamido>-ethyl)-benzenesulfonyl]-N'-cyclohexyl-urea (melting point: 154–155° C.)

from

4-[β-(α-chloro-4-methyl - phenylacetamido) - ethyl]-benzenesulfonamide (melting point: 147–148° C.)
the N-[4-(β-<α-chloro - 4 - methyl - phenylacetamido>-ethyl)-benzenesulfonyl]-N'-cyclohexyl - urea (melting point: 184–186° C.)
the N-[4-(β-<α-chloro - 4 - methyl - phenylacetamido>-ethyl)-benzenesulfonyl]-N'-butyl-urea (melting point: 166–168° C.)
the N-[4-(β-<α-chloro - 4 - methyl - phenylacetamido>-ethyl)-benzenesulfonyl]-N'-(4- methylcyclohexyl)-urea (melting point: 177–178° C.)

from

4-[β-(α-chloro-4-chloro - phenylacetamido) - ethyl]-benzenesulfonamide (melting point: 131–132° C.)
the N-[4-(β-chloro-4 - chloro - phenylacetamido>-ethyl)-benzenesulfonyl]-N'-cyclohexyl-urea (melting point: 168–170° C.)
the N-[4-(β-<α-chloro - 4 - chloro - phenylacetamido>-ethyl)-benzenesulfonyl]-N'-butyl-urea (melting point: 161–163° C.)
the N-[4-(β-<α-chloro - 4 - chloro - phenylacetamido>-ethyl)-benzenesulfonyl]-N'-(4- methylcyclohexyl)-urea (melting point: 171–173° C.)

from

4-[β-(α-chloro-phenylacetamido)-ethyl]-benzenesulfonamide (melting point: 130–131° C.)
the N-[4 - (β-<α-chlorophenylacetamido>-ethyl) - benzenesulfonyl]-N'-cyclohexyl-urea (melting point: 174–176° C.)
the N-[4-(β<α-chlorophenylacetamido>-ethyl)-benzenesulfonyl] N₂(4-methylcyclohexyl)-urea (melting point. 174–176° C.) and
the N-[4-(β-<α-chlorophenylacetamido>-ethyl)-benzenesulfonyl]-N'-(4 - ethylcyclohexyl)-urea (trans) (melting point: 159–162° C.)

from 4-(α-chlorophenylacetamido)-methyl)-benzenesulfonamide (melting point: 145° C.)
the N-[4-(α-chlorophenylacetamido-methyl)-benzenesulfonyl]-N'-cyclohexyl-urea (melting point: 194.5–196° C.)
the N-[4-(α-chlorophenylacetamido-methyl)-benzenesulfonyl]-N'-(4-methcyclohexyl)-urea (trans) (melting point: 192–193.5° C.) and
the N-[4-(α-chlorophenylacetamido-methyl)-benzenesulfonyl]-N'-(4-ethylcyclohexyl)-urea (trans) (melting point: 189–190° C.)

from

4-[β-(β-benzoyl -propionamido)-ethyl]-benzenesulfonamide (melting point: 160–161° C.)
the N-[4-(β-<β-benzoylpropionamido>ethyl)-benzenesulfonyl-N'-cyclohexyl - urea (melting point: 161–162° C.) and
the N-[4-(β-<β-benzoylpropionamido>-ethyl)-benzenesulfonyl]-N'-4-(methylcyclohexyl)urea (trans) (melting point: 177° C.)

from

4-[β-(β-benzoylacrylamido) ethyl]-benzenesulfonamide (melting point: 184° C., decomposition)
the N-[4-(β-<β-benzoylacrylamido>-ethyl)-benzenesulfonyl]-N'-(4-methylcyclohexyl)-urea (trans)

from

4-[β-(α-chlorophenylacetamido)-propyl]-benzenesulfonamide (melting point: 174° C.)
the N-[4-(β-<α-chlorophenylacetamido>-propyl)-benzene-sulfonyl]-N'-cyclohexyl-urea (melting point: 198° C.) and
the N-[4-(β-<α-chlorophenylacetamido>-propyl)-benzene-sulfonyl]-N'-(4-methylcyclohexyl)-urea (melting point: 170° C.)

from

4-[γ-(α-chlorophenylacetamido)-propyl]-benzenesulfonamide (melting point: 156° C.)
the N-[4-(γ-<α-chlorophenylacetamido>-propyl)-benzene-sulfonyl]-N'-cyclohexyl-urea (melting point: 169° C.) and
the N-[4-(γ-<α-chlorophenylacetamido>-propyl)-benzene-sulfonyl]-N'-(4-methylcyclohexyl)-urea (melting point: 183° C.)

from 4-(β-benzoylacetamido-ethyl)-benzenesulfonamide (melting point: 210–212° C.) and cyclohexylisocyanate
the N-[4-(β-benzoylacetamido-ethyl)-benzenesulfonyl]-N'-cyclohexyl-urea (melting point: 128–130° C.) and
with 4-methylcyclohexyl-isocyanate (trans)
the N-[4-(β-benzoylacetamido-ethyl)-benzenesulfonyl]-N'-4-methylcyclohexyl-urea (melting point: 177–179° C.)

from

4-[β-(β-hydroxy-β-phenyl-propionamido)-ethyl]benzene-sulfonamide (melting point: 187–189° C.)
the N-[4-(β-<β-hydroxy-β-phenylpropionamido>-ethyl) benzenesulfonyl]-N'-cyclohexyl-urea (melting point: 180–182° C.) and
the N-[4-(β-<β-hydroxy-β-phenylpropionamido>-ethyl) benzenesulfonyl]-N'-4-methylcyclohexyl-urea (trans) (melting point: 170–172° C.)

from

4-[β-(α-acetoxy-phenylacetamido)-ethyl]-benzenesulfonamide (melting point: 148–150° C.)
the N-[4-(β-<α-acetoxy-phenylacetamido>-ethyl)benzenesulfonyl]-N'-isobutyl-urea (melting point: 170–172° C.)
the N-[4-(β-<α-acetoxy-phenylacetamido>-ethyl)benzenesulfonyl]-N'-cyclohexyl-urea (melting point: 115–117° C.) and
the N-[4-(β-<α-acetoxy-phenylacetamido>-ethyl)benzene- sulfonyl]-N-4-methylcyclohexyl-urea (trans) (melting point: 179–181° C.)

from 4-(β-<α-chloro-3-chlorophenyl-acetamido>-ethyl)-benzene-sulfonamide (melting point; 94–96° C.)
the N-[4-(β-<α-chloro-3-chlorophenylacetamido>-ethyl)-benzenesulfonyl]-N'-butyl-urea (melting point: 159–161° C.)
the N-[4-(β-<α-chloro-3-chloro-phenyl-acetamido>-ethyl)-benzenesulfonyl]-N'-(4-methyl-cyclohexyl)-urea (melting point: 182–184° C.)

from 4-(β-<α-ethoxy-4-methyl-phenylacetamido>-ethyl) benzene-sulfonamide (melting point: 134–136° C.)
the N-[4-(β-<α-ethoxy-4-methyl-phenylacetamido> ethyl)-benzenesulfonyl]-N'-cyclohexyl-urea (melting point: 179–181° C.)
the N-[4-(β-<α-ethoxy-4-methyl-phenylacetamido> ethyl)-benzenesulfonyl]-N'-(4-methyl-cyclohexyl)-urea (melting point: 139–141° C.)
the N-[4-(β-<α-ethoxy-4-methyl-phenylacetamido> ethyl)-benzenesulfonyl]-N'-(4-ethyl-cyclohexyl-urea (melting point: 137–139° C.)

from 4-(β-<α-methoxy-4-methyl-phenylacetamido>-ethyl) benzene-sulfonamide (melting point: 140–142° C.)
the N-[4-(β-<α-methoxy-4-methyl-phenylacetamido> ethyl)-benzenesulfonyl]-N'-cyclohexyl-urea (melting point: 179–181° C.)

from 4-(β-<α-methoxy-4-chlorophenylacetamido>-ethyl) benzene-sulfonamide (melting point: 155–157° C.)
the N-[4-(β<α-methoxy-4-chlorophenylacetamido> ethyl)-benzenesulfonyl]-N'-(4-methyl-cyclohexyl) urea (melting point: 183–185° C.).

EXAMPLE 2

N-[4-(β-<α-hydroxy-phenylacetamido>-ethyl)-benzenesulfonyl]-N'-cyclohexyl-urea 6 g. of N-[4-(β-<α-acetoxy-phenylacetamido>-ethyl)-benzenesulfonyl]-N'-cyclohexyl-urea was dissolved in 250 ml. of 1 N NaOH by heating them on the steam bath. After 10 minutes of heating, the substance was filtered with the use of charcoal and the filtrate was acidified with dilute hydrochloric acid. The precipitate obtained had a melting point of 191–193° C. (from ethanol).

In analogous manner there were obtained:

the N - [4- (β - <α - hydroxyphenylacetamido> - ethyl)-benzenesulfonyl]-N'-4-methylcyclohexyl - urea (trans) (melting point: 184–186° C.) and
the N - [4 - (β - <α - hydroxyphenylacetamido> - ethyl)-benzene-sulfonyl]-N'-isobutyl - urea (melting point: 101–103° C.).

EXAMPLE 3

N-[4-(β-<α-methoxyphenylacetamido>-ethyl)-benzenesulfonyl]-N'-cyclohexyl-urea 4.9 g. of N-[4 - (β-<α-methoxy-phenylacetamido>-ethyl)-benzenesulfonyl]-N'-cyclohexyl-thiourea (melting point: 151–153° C. from methanol) were dissolved in a calculated amount of 1 N NaOH (⅟₁₀₀ mol). The whole was heated to about 40° C. and an excess of mercury oxide was added while stirring. After a period of about 15 minutes, the substance was filtered. By acidifying the filtrate, there was obtained a crystalline precipitate of N-[4 - (β - <α - methoxy - phenylacetamido> - ethyl) - benzenesulfonyl]-N'-cyclohexyl-urea which had a melting point of 181–193° C. after recrystallization from methanol.

EXAMPLE 4

N-[4-(β-<α-chlorophenylacetamido>-ethyl)-benzenesulfonyl]-N'-(4-methylcyclohexyl)-urea 9.9 g. of N-[4-(β-<α-chlorophenylacetamido>-ethyl)-benzenesulfonyl]-urea (melting point: 162–163.5° C.) were refluxed in a mixture of 300 ml. of toluene, 30 ml. of glycomonomethyl ether, 1.65 g. of glacial acetic acid and 3.1 g. of 4-methylcyclohexyl-amine for 5 hours while stirring. The reaction mixture was concentrated in vacuo and the residue was triturated with alcohol. The N-[4-(β-<α - chlorophenylacetamido> - ethyl) - benzenesulfonyl]-N'-(4-methylcyclohexyl)-urea obtained as raw product, had a melting point of 174–176° C., after recrystallization from dimethylformamide/water.

EXAMPLE 5

(a) N-[4-(β-<methoxy-phenylacetamido> - ethyl) - benzenesulfonyl]-N'-cyclohexyl-isourea methyl ether 2.0 g. of N-[4-(β-<methoxy-phenylacetamioo>-ethyl)-benzenesulfonyl]-N'-cyclohexyl-thiourea (melting point: 151–153° C.) were dissolved in 100 ml. of methanol. 0.86 g. of mercury hydroxide (HgO) was added and stirring was continued for 6 hours at a temperature of 50° C. The mercury sulfide formed was filtered off with suction and the methanol was distilled off. There remained a residue of 1.6 g. of viscous and colourless oil.

(b) N-[4-(β-<methoxy-phenylacetamido>-ethyl)-benzenesulfonyl]-N'-cyclohexyl-urea The N-[4-(β-<methoxy-phenylacetamido>-ethyl)-benzenesulfonyl]-N'-cyclohexyl-isourea methyl ether obtained as raw product, was covered with concentrated hydrochloric acid (excess) and was heated for 10 minutes on the steam bath. The substance was allowed to cool, the hydrochloric acid was decanted, the substance was washed with water and recrystallized from aqueous methanol. The N - [4-(β-<methoxy-phenylacetamido>-ethyl)-benzenesulfonyl]-N'-cyclohexyl-urea thus obtained, had a melting point of 181–183° C.

We claim:
1. A compound of the formula

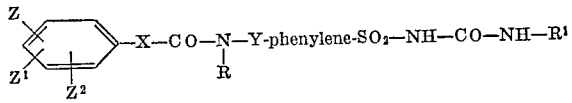

wherein

R is hydrogen, lower alkyl or lower phenylalkyl;
R¹ is (a) alkyl or alkenyl of 2 to 8 carbon atoms; (b) lower phenylalkyl or phenylcyclopropyl; (c) lower cyclohexylalkyl, cycloheptylmethyl, cycloheptylethyl or cyclooctylmethyl; (d) endoalkylene - cyclohexyl, endoalkylene-cyclohexenyl, endoalkylene-cyclohexylmethyl, or endoalkylene-cyclohexenylmethyl with 1 to 2 endoalkylene-carbon atoms, (e) lower alkyl-cyclohexyl or lower alkoxycyclohexenyl; (f) cycloalkyl of 5 to 8 carbon atoms; or (g) cyclohexenyl or cyclohexenylmethyl;
X is a saturated or mono-olefinically unsaturated hydrocarbon chain of 1 to 6 carbon atoms that is substituted by halogen, hydroxy, oxo, loweralkanoyloxy or lower alkoxy;
Y is a saturated hydrocarbon chain containing 1 to 4 carbon atoms;
Z is hydrogen, lower alkyl, lower alkoxy, halogen, cycloalkoxy of 5 to 6 carbon atoms, cyclohexyl, lower alkylmercapto, lower alkylsulfinyl, lower alkylsulfonyl, phenylsulfonyl, phenyl, lower phenylalkyl, lower alkanoyl, benzoyl, trifluoromethyl, hydroxy, lower alkanoyloxy, benzyloxy, carboxy, lower carbalkoxy, nitrile, carbamyl, lower alkylcarbamyl, lower dialkylcarbamyl or nitro; and
Z¹ and Z² are hydrogen, lower alkyl, lower alkoxy or halogen when Z is hydrogen, hydroxy, carboxy, alkyl, alkoxy or halogen, or Z¹ and Z² together are

when Z is hydrogen; or a physiologically tolerable salt thereof.

2. N - [4 - (β - <α - chlorophenylacetamido> - ethyl)-benzenesulfonyl]-N'-cyclohexyl-urea or a physiologically tolerable salt thereof.
3. N - [4 - (β - <α - methoxy - phenylacetamido>-ethyl) - benzenesulfonyl] - N' - (4 - ethyl - cyclohexyl)-urea or a physiologically tolerable salt thereof.
4. N - [4 - (β - <α - ethoxy - phenylacetamido> - ethyl)-benzenesulfonyl]-N'-cyclohexyl-urea or a physiologically tolerable salt thereof.
5. N - [4 - (β - <α - ethoxy - phenylacetamido> - ethyl)-benzenesulfonyl]-N'-butyl-urea or a physiologically tolerable salt thereof.
6. N - [4 - (β - <α - ethoxy - phenylacetamido>-ethyl)-benzenesulfonyl]-N'-(4-ethyl-cyclohexyl) - urea or a physiologically tolerable salt thereof.
7. N - [4 - (β - <α - chlorophenylacetamido>-ethyl)-benzenesulfonyl] - N'-(4-methyl - cyclohexyl) - urea or a physiologically tolerable salt thereof.
8. N - [4 - (β - <α - methoxy - phenylacetamido>-ethyl)-benzenesulfonyl]-N'-cyclohexyl-urea or a physiologically tolerable salt thereof.
9. N - [4 - (β - <α - isopropoxy - phenylacetamido>-ethyl) - benzenesulfonyl] - N' - cyclohexyl - urea or a physiologically tolerable salt thereof.
10. N - [4 - (β - <α - chloro - 4 - chlorophenylacetamido>-ethyl)-benzenesulfonyl]-N'-cyclohexyl-urea or a physiologically tolerable salt thereof.
11. N - [4 - (β - <α - chloro - 4 - chlorophenylacetamido> - ethyl) - benzenesulfonyl] - N' - butyl - urea or a physiologically tolerable salt thereof.
12. N - [4 - (β - <α - chloro - 4 - methyl - phenylacetamido> - ethyl) - benzenesulfonyl] - N' - (4 - methylcyclohexyl)-urea or a physiologically tolerable salt thereof.
13. N - [4 - (β - <α - chloro - 4 - methyl - phenylacetamido> - ethyl) - benzenesulfonyl] - N' - cyclohexyl-urea or a physiologically tolerable salt thereof.
14. N - [4 - (β - <α - chloro - 3 - chlorophenylacetamido> - ethyl) - benzenesulfonyl] - N' - butyl - urea or a physiologically tolerable salt thereof.
15. N - [4 - (β - <α - chloro - 3 - chlorophenylacetamido> - ethyl) - benzenesulfonyl] - N' - (4 - methylcyclohexyl)urea or a physiologically tolerable salt thereof.
16. N - [4 - (β - <α - ethoxy - 4 - methyl - phenylacetamido> - ethyl) - benzenesulfonyl] - N' - (4 - methylcyclohexyl)-urea or a physiologically tolerable salt thereof.
17. N - [4 - (β - benzoyl - acetamido - ethyl) - benzenesulfonyl]-N'-(4-methyl-cyclohexyl)-urea or a physiologically tolerable salt thereof.
18. N - [4 - (β - 3 - phenyl - 3 - hydroxy - propionamido - ethyl) - benzenesulfonyl] - N' - (4 - methyl - hydrohexyl)-urea or a physiologically tolerable salt thereof.

19. N - [4 - (γ - <α - chloro - phenylacetamido> - propyl)-benzenesulfonyl]-N'-cyclohexyl-urea or a physiologically tolerable salt thereof.

References Cited

German Auslegeschrift 1,185,180, 11 pages, published Jan. 14, 1965.

Momose et al.: J. Pharm. Soc. Japan, vol. 81, pp. 1045–1047 (1961).

JOHN D. RANDOLPH, *Primary Examiner.*

U.S. Cl. X.R.

167—65; 260—309.5, 327, 340.5, 347.2, 465, 470, 516, 543, 545, 551, 556